United States Patent [19]

Nakahara et al.

[11] Patent Number: 4,948,844

[45] Date of Patent: Aug. 14, 1990

[54] PROCESS FOR PREPARATION OF PERFLUORINATED COPOLYMER

[75] Inventors: Akihiko Nakahara, Yamaguchi; Yuji Iseki; Kouichi Murata, both of Tokuyama, all of Japan

[73] Assignee: Tokuyama Soda Kabushiki Kaisha, Japan

[21] Appl. No.: 338,209

[22] Filed: Apr. 14, 1989

[30] Foreign Application Priority Data

Apr. 16, 1988 [JP] Japan .................................. 63-92657

[51] Int. Cl.$^5$ .............................................. C08F 8/22
[52] U.S. Cl. .................................. 525/356; 525/326.4
[58] Field of Search ............................. 525/356, 326.4

[56] References Cited

U.S. PATENT DOCUMENTS 3,528,954 9/1970 Carlson .
4,714,756 12/1987 Buckmaster ..................... 525/326.4
4,743,658 5/1988 Imbalzano et al. ............... 525/326.4

FOREIGN PATENT DOCUMENTS 812116 4/1959 United Kingdom .

OTHER PUBLICATIONS

H. Shinohara et al., Journal of Polymer Science, "Fluorination of Polyhydrofluoroethylenes. I. Direct Fluorination of Poly(Vinyl Fluoride) Film", Part A-I, vol. 10, pp. 2129-2137 (1972).

*Primary Examiner*—Bernard Lipman
*Attorney, Agent, or Firm*—Sherman & Shalloway

[57] ABSTRACT

Disclosed is a process for the preparation of a perfluorinated copolymer having a predetermined ratio of monomer units, which comprises copolymerizing 99.5 to 50 mole % of (I) tetrafluoroethylene with 0.5 to 50 mole % of (II) a monomer represented by the following general formula:

$$CF_2=CFOCH_2C_nF_lX_mH_{(2n+1-l-m)} \quad (II)$$

wherein X stands for —Cl or —Br, n is an integer of at least 0, l is an integer of from 0 to (2n+1), m is 0 or 1, and the relation of $1+m \leq 2n+1$ is established, in the state where both the monomers are dissolved at a predetermined monomer ratio in an organic solvent, to thereby form a copolymer comprising units of the monomers at a ratio substantially equal to said predetermined monomer ratio, and fluorinating said copolymer with molecular fluorine.

The heat resistance is highly improved in the copolymer obtained according to this process without degradation of other physical properties, and generation of hydrogen fluoride by heat is hardly caused. Since the molar ratio between the starting monomers can be substantially maintained in the formed copolymer, the composition of the copolymer can be easily controlled.

8 Claims, 2 Drawing Sheets

[MI] = 2,2,3,3,3-pentafluoropropyl-trifluorovinyl ether

[MI] = perfluoropropylvinyl ether

PROCESS FOR PREPARATION OF PERFLUORINATED COPOLYMER

BACKGROUND OF THE INVENTION (1) Field of the Invention

The present invention relates to a process for the preparation of a perfluorinated copolymer.

(2) Description of the Related Art

A tetrafluoroethylene/perfluoroalkylvinyl ether copolymer (hereinafter referred to as "TFE-PFAVE copolymer") obtained by copolymerizing tetrafluoroethylene (hereinafter referred to as "TFE") with a perfluoroalkylvinyl ether (hereinafter referred to as "PFAVE") is excellent in the melt-moldability over a homopolymer of TFE while retaining high heat resistance and chemical resistance. Accordingly, this copolymer is widely used in various fields, for example, as linings and hoses in the chemical industry, electric wire coverings in the electric and electronic industries, and other molded articles.

As the process for the production of this TFE-PFAVE copolymer, a process in which TFE is merely copolymerized with PFAVE is known at the present (see Japanese Patent Publication No. 48-2223).

However, this process involves the following problems.

In the first place, PFAVE used as the starting material is ordinarily prepared by reacting a dimer of hexafluoropropene oxide with an alkali metal salt and thermally decomposing the reaction product, and this synthesis of PFAVE includes many steps and yields are low at some of these steps. Therefore, the overall yield is low, and PFAVE is expensive.

Furthermore, since PFAVE is poor in the polymerizability, the utilization ratio of PFAVE, that is, the ratio of the units of PFAVE present in the bonded state in the copolymer to the amount of PFAVE charged at the polymerization, is very low. For example, in the process disclosed in Japanese Patent Publication No. 48-2223, the utilization ratio of PFAVE to the charged amount is only several to 30%. Therefore, a special method or step is necessary for recovering expensive PFAVE.

Moreover, the TFE-PFAVE copolymer obtained by the copolymerization of TFE with PFAVE contains at molecule ends —COOH, —CH$_2$OH or —COF groups derived from a polymerization initiator or a chain transfer agent or formed by the termination of radicals on the growing chain, and since these terminal groups are thermally unstable and are oxidized or thermally decomposed by heat applied at the molding step to cause generation of hydrogen fluoride or inclusion of bubbles in a molded article. Therefore, corrosion of a molding machine is often caused and the ratio of defective molded articles is increased by inclusion of bubbles.

Still further, a molded article of a TFE-PFAVE copolymer is frequently used for the production of semiconductors where a high purity is required, but problems caused by minute amounts of impurities such as hydrogen fluoride are recently discussed [Proceeding of Annual Technical Meeting of Institute of Environmental Science (32nd meeting), 1986, pages 397–407].

As is apparent from the foregoing description, although the TFE-PFAVE copolymer obtained by copolymerizing TFE with PFAVE have inherently excellent properties such as excellent heat resistance, chemical resistance and electric characteristics, the copolymer involves various problems as mentioned above.

SUMMARY OF THE INVENTION

Under this background, we made research with a view to developing a process for preparing at a high efficiency a TFE-PFAVE copolymer capable of exerting excellent inherent characteristics sufficiently.

It is therefore a primary object of the present invention to provide a process in which a TFE-PFAVE copolymer comprising TFE units and PFAVE units at a predetermined ratio is prepared by maintaining a predetermined molar ratio between the two monomers.

Another object of the present invention is to provide a process for preparing a TFE-PFAVE copolymer which is advantageous over a TFE-PFAVE copolymer obtained by copolymerizing a TFE monomer with a PFAVE monomer, in that generation of a corrosive gas such as hydrogen fluoride gas by thermal decomposition is controlled.

In accordance with the present invention, these and other objects can be attained by a process for the preparation of a perfluorinated copolymer having a predetermined ratio of monomer units, which comprises copolymerizing 99.5 to 50 mole % of (I) tetrafluoroethylene with 0.5 to 50 mole % of (II) a monomer represented by the following general formula:

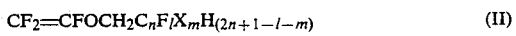

$$CF_2=CFOCH_2C_nF_lX_mH_{(2n+1-l-m)} \tag{II}$$

wherein X stands for —Cl or —Br, n is an integer of at least 0, l is an integer of from 0 to (2n+1), m is 0 or 1, and the relation of $1+m \leq 2n+1$ is established, in the state where both the monomers are dissolved at a predetermined monomer ratio in an organic solvent, to thereby form a copolymer comprising units of the monomers at a ratio substantially equal to said predetermined monomer ratio, and fluorinating said copolymer with molecular fluorine.

DETAILED DESCRIPTION OF THE INVENTION

Figure 1:
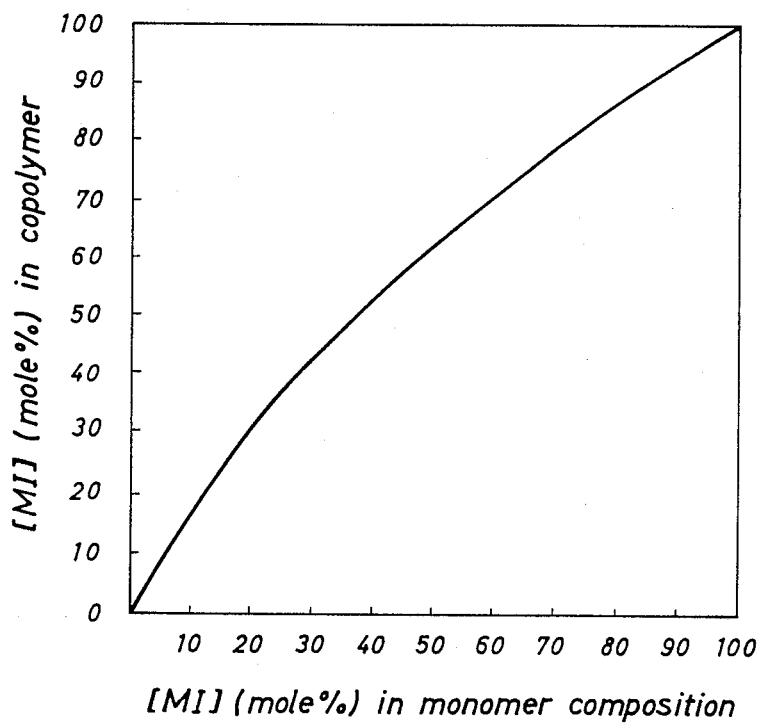
FIG. 1 is a graph showing the monomer composition in a copolymer obtained by the copolymerization between 2,2,3,3,3-pentafluoropropyltrifluorovinyl ether and tetrafluoroethylene.

In direct fluorination of polymers having hydrogens bonded to the main chain with fluorine molecules, for example, fluorination of polyvinyl fluoride disclosed in J. Poly. Sci. Part A-1, Vol 10, page 2129 (1972), the yield is generally poor, and it is known that in some cases, the physical properties of the fluorinated polymer are degraded. In contrast, the copolymer of TFE with the fluorine-containing alkylvinyl ether (II) having a specific structure according to the present invention can be fluorinated to a perfluorinated copolymer in a yield of almost 100%, and by the fluorination, the heat resistance can be highly improved without degradation of other physical properties.

A polymer of a monomer $CF_2=CF-OR$ (in which R stands for an alkyl radical or a fluorinated alkyl radical), which is one of the fluorine-containing alkylvinyl ether (II) used in the present invention, or a copolymer of TFE with this monomer, is disclosed in the specification of British Patent No. 812,116. However, since the process disclosed in this British patent specification is an emulsion polymerization process using water as the medium, it is impossible to freely control the ratio between the units of the two monomers in the copolymer to a predetermined ratio, as in the present invention.

Moreover, the above-mentioned British patent specification does not teach the production of a perfluorinated copolymer at all. Furthermore, in the British patent specification, it is not taught or suggested that if the disclosed copolymer is fluorinated, the heat resistance can be improved without degradation of other physical properties.

In contrast, the present invention provides a process for the preparation of a perfluorinated copolymer having a predetermined ratio of monomer units, which comprises copolymerizing 99.5 to 50 mole % of (I) tetrafluoroethylene with 0.5 to 50 mole % of (II) a monomer represented by the following general formula:

$$CF_2=CFOCH_2C_nF_lX_mH_{(2n+1-l-m)} \quad (II)$$

wherein X stands for —Cl or —Br, n is an integer of at least 0, l is an integer of from 0 to (2n+1), m is 0 or 1, and the relation of $l+m \leq 2n+1$ is established, in the state where both the monomers are dissolved at a predetermined monomer ratio in an organic solvent, to thereby form a copolymer comprising units of the monomers at a ratio substantially equal to said predetermined monomer ratio, and fluorinating said copolymer with molecular fluorine.

In accordance with one preferred embodiment of the present invention, at the start of the copolymerization reaction, the pressure of TFE (I) in the gas phase zone in a polymerization vessel is adjusted to a predetermined level within a range of from 1 to 100 kg/cm²G and the polymerization is carried out. According to this embodiment, the ratio between the units of the monomer (I) and the units of the monomer (II) in the obtained perfluorinated copolymer can be controlled to a predetermined ratio. Namely, a copolymer having a monomer unit ratio substantially equal to the starting monomer ratio can be obtained.

In the present invention, it is preferred that in the obtained copolymer, the content of the units of TFE (I) be 99.5 to 50 mole % and the content of the units of the fluorine-containing alkylvinyl ether (II) be 0.5 to 50 mole %. A copolymer in which the content of the units of the monomer (II) is lower than 0.5 mole % gives only a perfluorinated copolymer poor in the moldability. If the content of the units of the monomer (II) exceeds 50 mole %, the perfluorination becomes difficult, and the physical properties of the perfluorinated copolymer obtained by the fluorination are somewhat degraded.

One of the monomers to be copolymerized in the present invention is TFE (I), and the other monomer is a fluorine-containing alkylvinyl ether (II). Any of the monomers represented by the above-mentioned formula (II) can be used as the monomer (II) without any limitation. As preferred examples of the monomer (II), the following monomers can be mentioned:

$CF_2=CFOCH_3$,  $CF_2=CFOCH_2F$,
$CF_2=CFOCH_2CF_3$,  $CF_2=CFOCH_2CF_2H$,
$CF_2=CFOCH_2CF_2CF_3$,  $CF_2=CFOCH_2CF_2CF_2H$,
$CF_2=CFOCH_2CF_2CF_2CF_3$,
$CF_2=CFOCH_2CF_2CF_2CF_2H$,
$CF_2=CFOCH_2CF_2CF_2CF_2CF_3$,
$CF_2=CFOCH_2CF_2CF_2CF_2CF_2H$,
$CF_2=CFOCH_2CF_2CF_2Cl$ and
$CF_2=CFOCH_2CF_2CF_2Br$.

In view of the copolymerizability with TFE and the easiness of the fluorination of the copolymer, a compound in which n is an integer of 0 to 10 and l is in the range of from 2n to 2n+1 is preferred and a compound represented by the following formula:

$$CF_2=CFOCH_2(CF_2)_pY$$

wherein Y stands for —H, —F, —Cl or —Br and p is an integer of 1 to 5, is especially preferred.

The fluorine-containing alkylvinyl ether (II) used in the present invention can be prepared according to a known process.

Any of polymerization means where the polymerization is carried out in the state where the monomers (I) and (II) are dissolved in an organic solvent can be used as the copolymerization process without any limitation in the present invention. Alternatively, there can be adopted a process in which copolymerization is carried out in a mixed solvent comprising the organic solvent and water in an amount 0.3 to 10 times, preferably 1 to 5 times, the amount of the organic solvent and the copolymerization is then carried out. Since TFE as the monomer (I) is gaseous in many cases, it is preferred that TFE be supplied under pressure in a gas phase zone of a polymerization vessel.

The kind of the solvent used in the present invention is not particularly critical, but chlorofluorocarbons and perfluoro compounds are preferably used. For example, fluorine type solvents such as trichlorotrifluoroethane, dichlorotetrafluoroethane, trichlorofluoromethane, dichlorodifluoromethane, perfluorocyclohexane, perfluorocyclobutane, perfluorotributylamine, perfluorotriamylamine and perfluoropolyether are preferably used.

According to a specific example of the polymerization process, a deoxidized organic solvent and a fluorine-containing alkylvinyl ether are charged into a pressure vessel equipped with a stirrer and a thermometer. The amounts added of these components are selected so that difficult stirring caused by increase of the viscosity with the advance of the polymerization and difficult maintenance of the polymerization caused by failure to remove polymerization heat because of insufficient stirring can be prevented. It is generally preferred that the fluorine-containing alkylvinyl ether be added in an amount of 0.1 to 30 parts by weight, especially 1 to 10 parts by weight, per 100 parts by weight of the organic solvent. Distilled water can further be added.

For effecting deoxidization of the interior of the reaction vessel, the content in the reaction vessel is cooled and solidified and the deaeration operation is repeated. Then, TFE is supplied to the gas phase zone in the reaction vessel. A radical initiator dissolved in the organic solvent is supplied as the polymerization initiator, and the pressure of TFE is elevated to a predetermined level and the polymerization temperature is maintained.

The polymerization time depends on the pressure of TFE, the amount added of the radical initiator and the like, but a copolymer is sufficiently formed if the polymerization is carried out for scores of minutes to ten and several hours.

In the present invention, dialkyl peroxides, diacyl peroxides, peroxydicarbonates and azo type initiators can be used as the polymerization initiator. In view of the heat resistance, a fluorine-containing or perfluoro-type radical initiator is generally preferred. For example, there are preferably used diacyl peroxides represented by the following formulae:

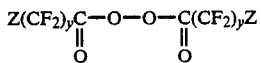

wherein Z stands for —H, —F or —Cl and y is an integer of from 1 to 5, and

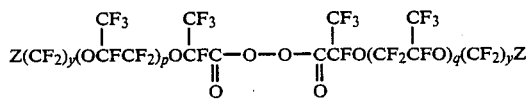

wherein Z and y are as defined above, and q is an integer of from 0 to 3.

Preferred examples of the radical generator used in the present invention are as follows:

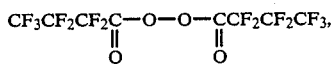

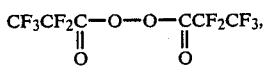

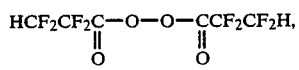

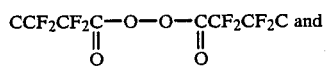

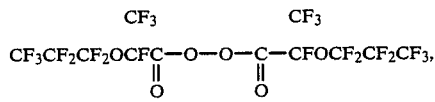

The amount used of the radical initiator depends on the solvent used and the polymerization conditions, especially the polymerization temperature. In general, however, the radical initiator is added in an amount of 0.5 to 20 mole %, preferably 1 to 10 mole %, based on the fluorine-containing alkylvinyl ether collectively at the time of the charging or intermittently.

Under some conditions, the polymerization is hardly advanced. In this case, it is preferred that the radical initiator be further added in the midway.

The polymerization is sufficiently advanced if the pressure of TFE is in the range of from 1 to 100 kg/cm²G, but it is preferred that the pressure of TFE be in the range of from 1 to 30 kg/cm²G. If the pressure of TFE is low, a copolymer having a low content of TFE is obtained. If the pressure of TFE is high, the content of TFE increases and the speed of formation of the copolymer becomes high. Of course, even if the pressure exceeds the lower limit or upper limit, the polymerization is advanced. However, if the pressure is too high, the equipment cost increases. The polymerization temperature is tentatively determined based on the decomposition rate of the used radical initiator as one criterion, but in general, the polymerization temperature is about 0° to about 100° C., preferably about 5° to about 80° C. If a fluorine-containing or perfluoro-type diacryl peroxide having a high decomposition rate even at a low temperature is used, it is preferred that the polymerization temperature is 5° to 60° C. In order to adjust the molecular weight, an organic compound such as methanol or methyl ether, methane, ethane can be added as the chain transfer agent, if necessary.

A fluoroolefin such as hexafluoropropene, chlorotrifluoroether or vinylidene fluoride can be added to TFE so as to improve the properties of the obtained copolymer. It is generally preferred that this compound be added in an amount of up to 5 mole % based on TFE.

The formed copolymer is separated from the organic solvent (and water) in the polymerization mixture and recovered. Although water can be easily separated from the copolymer by filtration, since the copolymer is dispersed at a high concentration in the organic solvent, it is sometimes impossible to recover the copolymer by filtration. In this case, the polymer can be recovered by using a centrifugal separator or by drying the copolymer under a reduced pressure. The fluorine-containing alkylvinyl ether used in the present invention is easily copolymerized with TFE, and if the pressure of TFE at the polymerization is 1 kg/cm²G or higher, substantially all of the fluorine-containing alkylvinyl ether is copolymerized in a short time, and the fluorine-containing alkylvinyl ether is not substantially detected in the organic solvent used for the polymerization. Accordingly, the step of recovering the fluorine-containing alkylvinyl ether is not necessary in the present invention. This is one of the advantages of the copolymerization process of the present invention.

Then, the separated copolymer is dried and fluorinated. The fluorination method customarily adopted for fluorination of a solid or powder, for example, a method disclosed in J. Poly. Sci. Part A-1, Vol. 10, page 2129 (1972), can be adopted, but in the present invention, the fluorination method using fluorine gas is preferably adopted in the present invention. The fluorination method using fluorine gas includes a liquid phase method in which the copolymer is suspended in a solvent having a low reactivity with fluorine, such as carbon tetrachloride or chlorofluoroethane, and fluorine, diluted with an inert gas according to need, is passed through the suspension to effect the fluorination, and a so-called gas phase method in which fluorine, diluted with an inert gas according to need, is directly contacted with the copolymer to effect the fluorination directly. The gas phase method is preferred because the apparatus can be simplified. In the gas phase method, the copolymer is charged in a reaction vessel formed of a material having a high resistance to corrosion by fluorine, and fluorine gas diluted with about 10 to about 100%, preferably about 50 to about 100%, of an inert gas such as nitrogen or He is supplied and the fluorination is carried out continuously or batchwise at a temperature of room temperature to 200° C., preferably 50° to 100° C., under a pressure of 1 to 20 kg/cm²G for several to about 100 hours, preferably about 5 to about 30 hours, under vibration or agitation for attaining a good contact.

According to the process of the present invention, since the fluorine-containing alkylvinyl ether used in the present invention has a very high polymerizability, the copolymerization with TFE is very easily advanced, and almost all of the fluorine-containing alkylvinyl ether charged in the reaction vessel is used for the polymerization. Accordingly, after termination of the polymerization, the unreacted fluorine-containing alkylvinyl ether need not be recovered.

In the conventional TFE-PFAVE copolymerization, the monomer composition in the obtained copolymer is greatly different from the composition of the charged monomers, and control of the monomer composition in the copolymer is very difficult. In contrast, in the copolymerization of the fluorine-containing alkylvinyl ether and TFE, since the composition of the charged monomers is very close to the monomer composition in the copolymer, the monomer composition in the copolymer can be very easily controlled.

The perfluorinated copolymer obtained according to the process of the present invention is different from the conventional TFE-PFAVE copolymer obtained by the copolymerization of TFE and PFAVE in that the copolymer of the present invention has no unstable group at the ends of the molecule chain. Accordingly, in the perfluorinated copolymer obtained according to the process of the present invention, the amount of hydrogen fluoride generated by heat is very small. Of course, excellent properties of the TFE-PFAVE copolymer, such as excellent heat stability and chemical resistance, are retained in the copolymer of the present invention.

Furthermore, the fluorine-containing alkylvinyl ether used as the starting material in the present invention is cheaper than PFAVE used as the starting material for the conventional TFE-PFAVE copolymer. Therefore, the process of the present invention is advantageous in the cost.

EXAMPLE 1

A 3-liter stainless steel autoclave equipped with a stirrer was charged with 1 l of 1,1,2-trichloro-1,2,2-trifluoroethane purified by distillation in advance, 10 g of $CF_2=CFOCH_2CF_2CF_3$ and 10 cc of 1,1,2-trichloro-1,2,2-trifluoroethane containing 1 g of $(CF_3CF_2CO_2)_2$, and the autoclave was cooled by liquefied oxygen to solidify the content. Then, deaeration was carried out by a vacuum pump, and nitrogen was introduced under a pressure of 3 kg/cm$^2$G. While maintaining this pressure, the temperature was elevated to a level where the content became liquid (about $-5°$ C.). This operation was repeated three times, whereby oxygen in the autoclave was removed. Then, the content was cooled and solidified again by liquefied oxygen and deaeration was carried out by a vacuum pump. Then, the temperature was elevated and when the temperature rose to about 15° C., TFE was introduced under a pressure of 3 kg/cm$^2$G, and dissolved to saturation in the content, and a TFE-introducing valve was closed. The temperature in the autoclave was elevated to 20° C. to initiate polymerization. When the polymerization was continued for 5 hours, the pressure in the autoclave was reduced almost to the vapor pressure of trichlorotrifluoroethane, and therefore, the polymerization was stopped at this point. The autoclave was connected to a vacuum pump through a trap for cooling and collecting the solvent and unpolymerized $CF_2=CFOCH_2CF_2CF_3$, and the pressure in the autoclave was reduced with stirring and the used solvent and unreacted fluorine-containing alkylvinyl ether were recovered in the trap. After the solvent was completely removed, the autoclave was opened. It was found that a white powdery copolymer was formed. The obtained copolymer was dried under reduced pressure at 150° C. for 10 hours to obtain about 150 g of the copolymer.

When the recovered solvent was analyzed by the gas chromatography, unpolymerized $CF_2=CFOCH_2CF_2CF_3$ was not detected, and it was confirmed that charged $CF_2=CFOCH_2CF_2CF_3$ was polymerized at a conversion of about 100%. When the conversion of TFE was calculated based on the change of the pressure, it was found that the conversion was about 97%. When the decomposition product obtained at 400° C. was analyzed by the pyrolytic gas chromatography-mass analysis method (hereinafter referred to as "Py-GC/MS"), $CF_3CF_2CH$ and $CF_3CF_2CH_3$ were detected as fragments. Accordingly, it was confirmed that the side chain had a structure of $-OCH_2CF_2CF_3$.

From the foregoing results and the results of the IR measurement, it was found that 3.1 mole % of the units of the monomer

were contained in the copolymer and this content was substantially in agreement with the charged monomer content of 3.0 mole %.

For the fluorination of the obtained copolymer, a stainless steel reactor having an inner capacity of 140 cc and being rotatable by a motor was charged with 35 g of the copolymer, and the interior of the reactor was deaerated and fluorine having a concentration of about 100% was introduced under a pressure of 8 kg/cm$^2$G into the reactor. Then, the reactor was immersed in an oil bath maintained at 85° C., and the fluorination was carried out with stirring for 15 hours. The gas in the reactor was replaced by nitrogen, and the fluorinated copolymer was taken out and heated under a reduced pressure in an oven maintained at 150° C. for 20 hours to obtain about 35 g of a white copolymer. When the obtained copolymer was analyzed by FT-IR, it was found that the copolymer contained 2.9 mole % of the units of

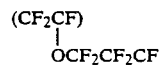

and no CH-bond was present.

EXAMPLES 2 THROUGH 5

Fluorine-containing copolymers differing in the monomer composition were synthesized by using the same polymerization apparatus and process as described in Example 1. The adopted conditions, the monomer conversions and the analysis values of the obtained copolymers are shown in Table 1.

Then, the obtained copolymers were fluorinated under conditions shown in Table 2. The obtained results are shown in Table 2.

TABLE 1

| Example No. | Amount (g) of FVE [*1] | Amount (mole %) of Radical Polymerization Initiator | Amount (l) of Solvent | Charged Ratio (mole %) | Polymerization Time (hours) | Conversion (%) FVE | Conversion (%) TFE | Content (mole %) of Units of FVE [*1] in Copolymer |
| --- | --- | --- | --- | --- | --- | --- | --- | --- |
| 2 | 4.8  | 2       | 1.0 | 1.3  | 3  | 98  | 97 | 1.3  |
| 3 | 30.0 | 5 (*2) | 1.5 | 6.0  | 7  | 100 | 98 | 5.8  |
| 4 | 48.0 | 10 (*3)| 1.1 | 12.5 | 8  | 99  | 99 | 12.0 |
| 5 | 89.0 | 8 (*4) | 0.8 | 26.0 | 10 | 98  | 98 | 25.0 |

Note
[*1] FVE = $CF_2\!=\!CFOCH_2CF_2CF_3$
[*2] $(HCF_2CF_2CO_2)_2$ was used as polymerization initiator
[*3] $(ClCF_2CF_2CO_2)_2$ was used as polymerization initiator

[*4] $(CF_3CF_2CF_2.OCF(CF_3).CO_2)_2$ was used as polymerization initiator

TABLE 2

| | | Fluorination Conditions | | | | | Reaction Results*1 | |
| --- | --- | --- | --- | --- | --- | --- | --- | --- |
| Example No. | Used Copolymer (Example No.) | Amount (g) of Copolymer Used | Fluorine Concentration (% by volume) | Fluorine Pressure (kg/cm²G) of gas mixture | Temperature (°C.) | Time (hours) | Amount (g) of fluorinated Copolymer | (—CF₂CF—) OCF₂CF₂CF₃ Composition (mole %) fluorinated |
| 2 | 2 | 28 | 70*2 | 10 | 100 | 22 | 28 | 1.2  |
| 3 | 3 | 15 | 60*3 | 4  | 85  | 20 | 15 | 5.2  |
| 4 | 4 | 10 | 100  | 4  | 80  | 18 | 10 | 11.0 |
| 5 | 5 | 10 | 100  | 15 | 60  | 20 | 10 | 23.0 |

Note
*1 CH-bond was not detected at IR analysis of fluorinated copolymer in each Example
*2 diluted with nitrogen
*3 diluted with He

EXAMPLE 6

An autoclave having an inner capacity of 300 ml was charged with 4.1 g of $CF_2\!=\!CFOCH_2(CF_2)_2CF_3$ and 150 ml of 1,1,2-trichloro-1,2,2-trifluoroethane as the solvent, and the deoxidization operation was carried out in the same manner as described in Example 1. Then, TFE was introduced under a pressure of 6 kg/cm²G, and after TFE was saturated by dissolution, a TFE-supplying valve was closed. The temperature in the autoclave was elevated to 20° C., 5 ml of a trichlorotrifluoroethane solution containing 0.15 g of $(CF_3CF_2CO_2)_2$ was introduced under a pressure.

When the polymerization was continued for 5 hours, the pressure in the autoclave was reduced almost to the vapor pressure of the solvent. The solvent was removed by distillation under a reduced pressure according to the procedures described in Example 1 to obtain a white powdery copolymer.

When the recovered solvent was analyzed by the gas chromatography, it was found that $CF_2\!=\!CFOCH_2(CF_2)_2CF_3$ was not present and the conversion was almost 100%. The conversion of TFE was almost 100% as determined from the change of the pressure.

When the obtained copolymer was dried under a reduced pressure at 150° C. for 10 hours and was analyzed by Py-GC/MS and IR, it was found that the content of the units of

was 1.4 mole %, which was substantially in agreement with the charged monomer ratio of 1.45 mole %.

Then, 30 g of the obtained copolymer was charged in a stainless steel tube having an inner diameter of 1 cm and having the periphery covered with a heater, and nitrogen was introduced from the lower end of the tube and discharged from the other side to substitute the inner atmosphere with nitrogen. Then, fluorine diluted to 50% by volume with nitrogen was introduced at a flow rate of 10 cc/min and discharged from the other end. The heater temperature was elevated to 85° C. and the reaction was continued for 20 hours.

After the reaction, about 30 g of the fluorinated copolymer was recovered. By the IR analysis, it was confirmed that the content of the units of

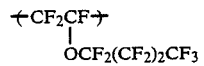

was 1.3 mole %. The absorption attributed to the CH-bond was not detected.

EXAMPLE 7

An autoclave having an inner capacity of 300 ml was charged with 1.6 g of $CF_2\!=\!CFOCH_2CF_2CF_2Cl$, 150 ml of 1,1,2-trichloro-1,2,2-trifluoroethane as the solvent and 0.5 g of $(CF_2CF_2CO_2)_2$ as the radical initiator, and the deoxidization operation was carried out according to the procedures described in Example 1. Then, TFE was introduced under a pressure of 3.0 kg/cm²G and dissolved to saturation. Then, the supply of TFE was stopped and polymerization was carried out at 20° C. for 5 hours.

By the Py-GC/MS and IR analysis of the obtained white powdery copolymer, it was found that the copolymer contained 2.7 mole % of the units of

OCH$_2$CF$_2$CF$_2$Cl

This content was substantially in agreement with the charged monomer molar ratio.

When the monomer conversions were measured, it was confirmed that each of the conversions of TFE and the fluorine-containing alkylvinyl ether was about 98%.

For the fluorination of the obtained copolymer, a 500 cc stainless steel reactor equipped with a stirrer and a condenser was charged with 15 g of the powdery copolymer and 300 g of perfluorotributylamine, and the inner atmosphere of the reactor was replaced by nitrogen. Then, fluorine diluted to 80% by volume by He was introduced at a flow rate of 10 cc/min and discharged through the condenser. The temperature in the reactor was maintained at 150° C. and reaction was continued for 15 hours while introducing fluorine. After the reaction, the powder was recovered by filtration, washed with trichlorotrifluoroethane and dried under a reduced pressure at 150° C. for 15 hours to obtain 14.5 g of a fluorinated copolymer. By the IR and Py-GC/MS analysis of the obtained copolymer, it was confirmed that the copolymer contained 2.5 mole % of the units of

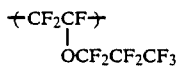
OCF$_2$CF$_2$CF$_3$ and the CH-bond and CCl-bond were not substantially contained.

EXAMPLE 8

Polymerization was carried out in the same manner as described in Example 1 except that 7.8 g of CF$_2$=CFOCH$_2$CF$_3$ was used as the fluorine-containing vinyl ether. The polymerization was substantially completed within 4 hours. When the conversions of the fluorine-containing alkylvinyl ether and TFE were determined in the same manner as described in Example 1, it was found that each conversion was about 98%. When the obtained copolymer was dried under a reduced pressure, about 145 g of a dry copolymer was obtained.

When the obtained copolymer was analyzed, it was found that the content of the units of

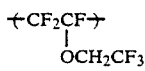
OCH$_2$CF$_3$ was 3.0 mole %, which was substantially in agreement with the starting molar ratio.

For the fluorination of the obtained copolymer, the same stainless steel reactor as used in Example 1 was charged with 10 g of the obtained copolymer, and fluorine gas diluted to 75% with He was sealed under a pressure of 5 kg/cm$^2$G in the stainless steel reactor and the fluorination was carried out at 85° C. for 20 hours.

By this fluorination, about 10 g of the fluorinated copolymer was obtained. By the analysis, it was found that the content of the units of

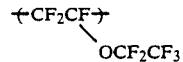
OCF$_2$CF$_3$ was about 2.6 mole %, and the CH-bond was not detected.

COMPARATIVE EXAMPLE 1

A 500-ml autoclave equipped with a stirrer was charged with 150 ml of distilled water, 4.2 g of CF$_2$=CFOCH$_2$CF$_2$CF$_3$, 0.26 g of (NH$_4$)$_2$S$_2$O$_6$ as the polymerization initiator and 0.1 g of ammonium perfluorooctanoate as the emulsifier, and the deoxidization was carried out in the same manner as described in Example 1. Polymerization was carried out at 70° C. under a TFE pressure of 3 kg/cm$^2$G for 2 hours, but the pressure was not substantially reduced. Therefore, the TFE pressure was increased to 6 kg/cm$^2$G and the polymerization was further carried out for 8 hours. The TFE pressure was released. When the autoclave was opened, it was found that a white opaque liquid containing a dispersed copolymer was formed. After the filtration, drying was carried out at 150° C. under a reduced pressure for 10 hours to obtain 6.6 g of a white powdery copolymer. By the Py-GC/MS and IR analysis, it was found that the content of the units of

was 2.0 mole %. When the conversion of the fluorine-containing alkylvinyl ether was determined from this result, it was found that the conversion was about 70%. Namely, the copolymerizability of TFE was poor, and the monomer unit composition in the obtained copolymer was not in agreement with the charged monomer composition.

The fluorination of the obtained copolymer was carried out by using the same process, conditions and apparatus as adopted in Example 1 to obtain a fluorinated copolymer in which the content of the monomer units of

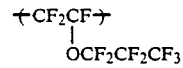
OCF$_2$CF$_2$CF$_3$ was 1.6 mole % and the CH-bond was not substantially contained.

EXAMPLE 9

The unfluorinated and fluorinated copolymers obtained in Examples 1 through 8 and Comparative Example 1 were subjected to the thermal analysis to determine thermal decomposition temperatures. By using a Koka-type flow tester, each of the foregoing copolymers was extruded under a load of 50 kg/cm$^2$ at 370° C. from a die having a hole diameter of 0.5 mm and a diameter of 5 mm, and the melt viscosity was determined. Furthermore, each copolymer was compressed at 350° C. to form a sheet having a thickness of 1 to 2 mm, and the yield strength, tensile strength and elongation were determined according to JIS K-7113. The obtained results are shown in Table 3.

Figure 2:
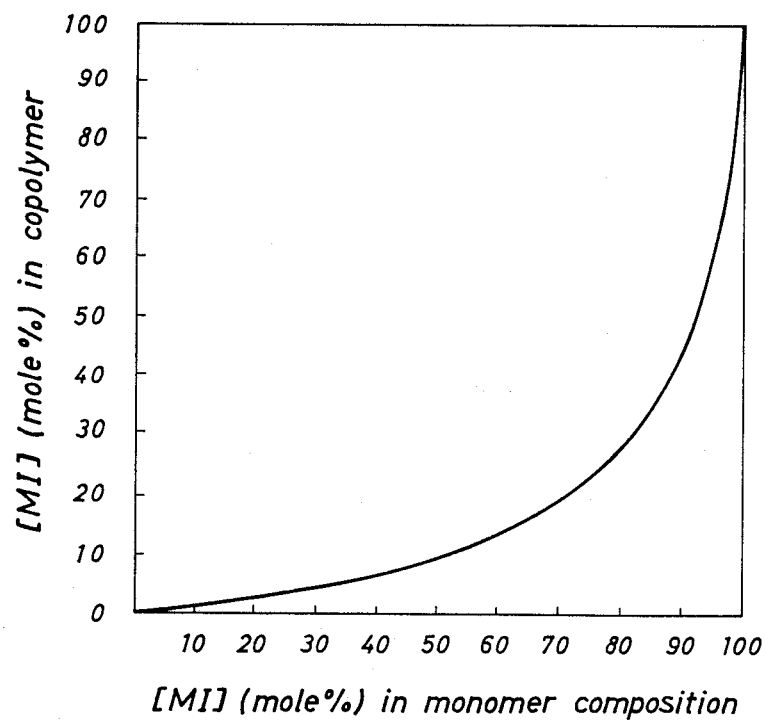
FIG. 2 is a graph showing the monomer composition in a copolymer obtained by the copolymerization between perfluoropropylvinyl ether and tetrafluoroethylene.

Each of the unfluorinated and fluorinated copolymers obtained in Examples 1 through 8 and Comparative Example 1 was compressed at 350° C. to obtain a sheet having a thickness of 1 to 2 mm. With respect to the obtained sheets, the chemical resistance characteristics were determined. Namely, each sheet was immersed in $H_2SO_4$, $HNO_3$, 50% NaOH, $CH_3COOH$, $PhCH_3$ or $PhNH_2$ at 100° C., in $CCl_4$ at 77° C., in $CFCl_2CF_2Cl$ at 40° C. or in $H_2O_2$ at room temperature for 7 days, and the change (%) of the weight was determined. The obtained results are shown in Table 4.

determined based on the copolymerization ratio disclosed in Zh. Prikl. Khim, 1984,57(5), 1126–1128. The obtained results are shown in FIG. 2.

COMPARATIVE EXAMPLE 2

The copolymerization was carried out in the same manner as described in Example 1 except that 5.0 g of perfluoropropylvinyl ether was used instead of the hydrofluoroalkyltrifluorovinyl ether.

TABLE 3

|  | Thermal Decomposition Temperature (°C.) | Melt Viscosity (poise) | Yield Strength ($kg/cm^2$) | Tensile Strength ($kg/cm^2$) | Elongation (%) |
| --- | --- | --- | --- | --- | --- |
| unfluorinated copolymer of Example 1 | 400 | $2.0 \times 10^4$ | 140 | 350 | 340 |
| fluorinated copolymer of Example 1 | 450 | $2.1 \times 10^4$ | 150 | 410 | 350 |
| unfluorinated copolymer of Example 2 | 410 | $1.2 \times 10^5$ | 150 | 330 | 280 |
| fluorinated copolymer of Example 2 | 450 | $1.2 \times 10^5$ | 140 | 390 | 330 |
| unfluorinated copolymer of Example 3 | 380 | $1.0 \times 10^4$ | 150 | 350 | 380 |
| fluorinated copolymer of Example 3 | 440 | $1.0 \times 10^4$ | 150 | 370 | 390 |
| unfluorinated copolymer of Example 4 | 350 | — | 130 | 300 | 390 |
| fluorinated copolymer of Example 4 | 420 | — | 140 | 310 | 400 |
| unfluorinated copolymer of Example 5 | 330 | — | 80 | 270 | 420 |
| fluorinated copolymer of Example 5 | 410 | — | 90 | 270 | 440 |
| unfluorinated copolymer of Example 6 | 410 | $1.0 \times 10^5$ | 140 | 330 | 290 |
| fluorinated copolymer of Example 6 | 450 | $1.1 \times 10^5$ | 140 | 380 | 320 |
| unfluorinated copolymer of Example 7 | 410 | $2.3 \times 10^4$ | 140 | 350 | 330 |
| fluorinated copolymer of Example 7 | 450 | $2.4 \times 10^4$ | 140 | 400 | 340 |
| unfluorinated copolymer of Example 8 | 400 | $2.0 \times 10^4$ | 150 | 340 | 330 |
| fluorinated copolymer of Example 8 | 450 | $2.0 \times 10^4$ | 150 | 400 | 350 |
| unfluorinated copolymer of Comparative Example 1 | 410 | $1.0 \times 10^6$ | 80 | 270 | 190 |
| fluorinated copolymer of Comparative Example 1 | 450 | $8.6 \times 10^5$ | 90 | 270 | 200 |

TABLE 4

|  | $H_2SO_4$ | $HNO_3$ | 50% NaOH | $CH_3COOH$ | $PhCH_3$ | $PhNH_2$ | $CCl_4$ | $CFCl_2CF_2Cl$ | $H_2O_2$ |
| --- | --- | --- | --- | --- | --- | --- | --- | --- | --- |
| unfluorinated copolymer of Example 1 | ±0 | ±0 | ±0 | ±0 | ±0 | ±0 | ±0 | ±0 | ±0 |
| fluorinated copolymer of Example 1 | ±0 | ±0 | ±0 | ±0 | ±0 | ±0 | ±0 | ±0 | ±0 |
| unfluorinated copolymer of Example 2 | ±0 | ±0 | ±0 | ±0 | ±0 | ±0 | ±0 | ±0 | ±0 |
| fluorinated copolymer of Example 2 | ±0 | ±0 | ±0 | ±0 | ±0 | ±0 | ±0 | ±0 | ±0 |
| unfluorinated copolymer of Example 3 | ±0 | ±0 | ±0 | ±0 | ±0 | +1 | +2 | ±0 | ±0 |
| fluorinated copolymer of Example 3 | ±0 | ±0 | ±0 | ±0 | ±0 | ±0 | +1 | ±0 | ±0 |
| unfluorinated copolymer of Example 4 | ±0 | ±0 | −1 | ±0 | +1 | +2 | +2 | +2 | ±0 |
| fluorinated copolymer of Example 4 | ±0 | ±0 | ±0 | ±0 | +1 | +1 | +2 | +2 | ±0 |
| unfluorinated copolymer of Example 5 | ±0 | ±0 | ±0 | ±0 | ±0 | ±0 | ±0 | ±0 | ±0 |
| fluorinated copolymer of Example 5 | ±0 | ±0 | ±0 | ±0 | ±0 | ±0 | ±0 | ±0 | ±0 |
| unfluorinated copolymer of Example 6 | ±0 | ±0 | ±0 | ±0 | ±0 | ±0 | ±0 | ±0 | ±0 |
| fluorinated copolymer of Example 6 | ±0 | ±0 | ±0 | ±0 | ±0 | ±0 | ±0 | ±0 | ±0 |
| unfluorinated copolymer of Example 7 | ±0 | ±0 | ±0 | ±0 | ±0 | ±0 | ±0 | ±0 | ±0 |
| fluorinated copolymer of Example 7 | ±0 | ±0 | ±0 | ±0 | ±0 | ±0 | ±0 | ±0 | ±0 |
| unfluorinated copolymer of Example 8 | ±0 | ±0 | ±0 | ±0 | ±0 | ±0 | ±0 | ±0 | ±0 |
| fluorinated copolymer of Example 8 | ±0 | ±0 | ±0 | ±0 | ±0 | ±0 | ±0 | ±0 | ±0 |
| unfluorinated copolymer of Comparative Example 1 | ±0 | ±0 | ±0 | ±0 | ±0 | ±0 | ±0 | ±0 | ±0 |
| fluorinated copolymer of Comparative Example 1 | ±0 | ±0 | ±0 | ±0 | ±0 | ±0 | ±0 | ±0 | ±0 |

EXAMPLE 10

In order to obtain a copolymerization composition curve, copolymerization between tetrafluoroethylene and 2,2,3,3,3-pentafluoropropyltrifluorovinyl ether was carried out by using Flon 113 as the solvent and $(C_2F_5COO)_2$ as the polymerization initiator. The concentration of the polymerization initiator was 0.3 to 1 mole % (based on the total monomers), and the polymerization was carried out at a polymerization temperature of 20° C. and a monomer conversion of 5 to 20 mole %. The copolymerization composition curve was determined according to the Fineman-Ross method. The obtained results are shown in FIG. 1. For comparison, the copolymerization composition curve between perfluoropropylvinyl ether and tetrafluoroethylene was TFE was introduced under a pressure of 3.0 $kg/cm^2G$ and the polymerization was carried out at 25° C. for 110 minutes.

The copolymer was obtained only in an amount of 1.5 g. When the solvent was analyzed, it was found that substantially all of the perfluoropropylvinyl ether was left in Flon 113.

By the FT-IR analysis of the copolymer, it was found that the copolymer contained 2.9 mole % of the perfluoropropylvinyl ether units. By the differential thermal analysis, it was confirmed that the melting point was 308° to 332° C., and by the thermobalance analysis, it was confirmed that the copolymer decomposed at a temperature of about 430° C.

We claim:

1. A process for the preparation of a perfluorinated copolymer, which comprises copolymerizing (I) tetrafluoroethylene with (II) a monomer represented by the following general formula:

$$CF_2=CFOCH_2C_nF_lX_mH_{(2n+1-l-m)} \quad (II)$$

wherein X stands for —Cl or —Br, n is an integer of at least 0, l is an integer of from 0 to (2n+1), m is 0 or 1, and the relation of $l+m \leq 2n+1$ is established, at a predetermined monomer molar ratio (I)/(II) of from 99.5/0.5 to 50/50 in the state where both the monomers are dissolved in an organic solvent, to thereby form a copolymer comprising units of the monomers at a ratio substantially equal to said predetermined monomer ratio, and fluorinating said copolymer with molecular fluorine.

2. A copolymerization process according to claim 1, wherein at the start of the copolymerization, the pressure of the tetrafluoroethylene (I) in the gas phase zone in a polymerization reaction vessel is adjusted to a predetermined level within the range of from 1 to 100 kg/cm$^2$G.

3. A copolymerization process according to claim 1, wherein the monomer (II) is a fluorine-containing alkylvinyl ether represented by the following general formula:

$$CF_2CF-O-CH_2C_nF_lX_mH_{(2n+1-l-m)}$$

wherein X stands for —Cl or —Br, n is an integer of from 0 to 10, l is an integer of from 2n to 2n+1, m is 0 or 1, and the relation of $l+m \leq 2n+1$, is established.

4. A copolymerization process according to claim 3, wherein the monomer (II) is a fluorine-containing alkylvinyl ether represented by the following general formula:

$$CF_2=CFOCH_2(CF_2)_pY$$

wherein Y stands for —H, —F, —Cl or —Br, and p is an integer of from 1 to 5.

5. A copolymerization process according to claim 1, wherein the monomer (II) is used in an amount of 0.1 to 30 parts by weight per 100 parts by weight of the organic solvent.

6. A copolymerization process according to claim 1, wherein the organic solvent is chlorofluorocarbon or perfluoro compound.

7. A copolymerization process according to claim 1, wherein the copolymerization of the monomers (I) and (II) is carried out in a mixed solvent comprising the organic solvent and water in an amount 0.3 to 10 times the amount of the organic solvent.

8. A process for the preparation of a perfluorinated copolymer, which comprises copolymerizing (I) tetrafluoroethylene with (II) a fluorine-containing alkylvinyl ether represented by the following general formula:

$$CF_2=CFOCH_2(CF_2)_pY$$

wherein Y represents —H, —F, —Cl or —Br and p is an integer of from 1 to 5, at a predetermined molar ratio (I)/(II) of from 99.5/0.5 to 50/50 in the state where both the monomers are dissolved in an organic solvent, at a temperature of about 0° to about 100° C. under a pressure of 1 to 100 kg/cm$^2$ gauge, to thereby form a copolymer comprising the monomers (I) and (II) at a ratio substantially equal to said predetermined monomer ratio, and fluorinating the copolymer with molecular fluorine at a temperature from room temperature to 100° C. under a pressure of 1 to 20 kg/cm$^2$ gauge.

* * * * *